(12) United States Patent
Denz et al.

(10) Patent No.: US 9,996,470 B2
(45) Date of Patent: Jun. 12, 2018

(54) WORKLOAD MANAGEMENT IN A GLOBAL RECYCLE QUEUE INFRASTRUCTURE

(71) Applicant: NetApp, Inc., Sunnyvale, CA (US)

(72) Inventors: Peter Denz, Cary, NC (US); Matthew Curtis-Maury, Apex, NC (US); Peter Wyckoff, Durham, NC (US)

(73) Assignee: NETAPP, INC., Sunnyvale, CA (US)

( * ) Notice: Subject to any disclaimer, the term of this patent is extended or adjusted under 35 U.S.C. 154(b) by 223 days.

(21) Appl. No.: 14/839,450

(22) Filed: Aug. 28, 2015

(65) Prior Publication Data

US 2017/0060753 A1 Mar. 2, 2017

(51) Int. Cl.
*G06F 12/08* (2016.01)
*G06F 12/0871* (2016.01)
(Continued)

(52) U.S. Cl.
CPC ...... *G06F 12/0871* (2013.01); *G06F 12/0813* (2013.01); *G06F 12/0868* (2013.01);
(Continued)

(58) Field of Classification Search
CPC ........... G06F 17/30362; G06F 12/0813; G06F 12/0868; G06F 12/0871; G06F 12/0875; G06F 2209/5019; G06F 2209/5022; G06F 2212/314; G06F 2212/452; G06F 2212/604; G06F 9/505; G06F 9/5072; G06F 9/5083; G06F 2009/45583; G06F 3/0604;
(Continued)

(56) References Cited

U.S. PATENT DOCUMENTS

| 6,523,060 B1 | 2/2003 | Kao |
| 7,701,949 B1 | 4/2010 | Rose et al. |

(Continued)

OTHER PUBLICATIONS

Non-Final Office Action on co-pending U.S. Appl. No. 14/743,322 dated Apr. 5, 2017.
(Continued)

*Primary Examiner* — Zhuo Li
(74) *Attorney, Agent, or Firm* — Klein, O'Neill & Singh, LLP

(57) ABSTRACT

Presented herein are methods, non-transitory computer readable media, and devices for integrating a workload management scheme for a file system buffer cache with a global recycle queue infrastructure. Methods for allocating a certain portion of the buffer cache without physically partitioning the buffer resources are disclosed which include: identifying a workload from a plurality of workloads; allocating the buffer cache in the data storage network for usage by the identified workload; tagging a buffer from within the buffer cache with a workload identifier and track each buffer; determining if the workload is exceeding its allocated buffer cache; and wherein determining the workload is exceeding its allocated percentage of buffer cache, enabling the workload's exceeded buffer to be available to scavenge; determining if the workload is exceeding a soft-limit on the allowable usage of the buffer cache, and wherein determining the workload is exceeding its soft-limit, degrading the prioritization of subsequent buffers, preventing the workload from thrashing out buffers of other workloads.

20 Claims, 12 Drawing Sheets

(51) Int. Cl.
  *G06F 12/0875* (2016.01)
  *G06F 12/0813* (2016.01)
  *G06F 12/0868* (2016.01)

(52) U.S. Cl.
  CPC .... *G06F 12/0875* (2013.01); *G06F 2212/314* (2013.01); *G06F 2212/452* (2013.01); *G06F 2212/604* (2013.01)

(58) Field of Classification Search
  CPC ............ G06F 12/0862; G06F 12/0895; G06F 12/0897; G06F 12/1045; G06F 12/0815; G06F 2212/602
  See application file for complete search history.

(56) References Cited

U.S. PATENT DOCUMENTS

| | | |
|---|---|---|
| 2006/0200456 A1 | 9/2006 | Zohar et al. |
| 2007/0094450 A1 | 4/2007 | Vanderwiel |
| 2008/0172673 A1* | 7/2008 | Naik ........................ G06F 9/505 718/104 |
| 2014/0223106 A1* | 8/2014 | Shivashankaraiah ...................... G06F 12/0866 711/136 |
| 2016/0117241 A1* | 4/2016 | Shah ................... G06F 12/0871 711/119 |
| 2016/0371225 A1 | 12/2016 | Denz et al. |

OTHER PUBLICATIONS

Final Office Action on co-pending U.S. Appl. No. 14/743,322 dated Nov. 16, 2017.

* cited by examiner

WORKLOAD MANAGEMENT IN A GLOBAL RECYCLE QUEUE INFRASTRUCTURE

TECHNICAL FIELD

The present disclosure relates generally to mass data storage networks and data storage filing systems. More particularly, aspects of this disclosure relate to methods, non-transitory computer readable media, and devices for integrating a workload management scheme for a file system buffer cache with a global recycle queue infrastructure.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. The resources of a storage server such as storage and access bandwidth are limited. There may be applications within the storage server that generate large workloads, making many access requests to the network. One way to improve resource use in a storage server is to provide caching in the form of buffer cache, recognizing that data accessed in a workload has a greater likelihood of being accessed again relative to other data stored in the data center. As a result, buffers in the buffer cache that are not expected to be needed soon are periodically scavenged to make space for newly accessed buffers, i.e. items are cleaned from the cache.

In a standard system configuration, the cache scavenger periodically cleans items from the cache. If an item is added to the cache and the cache is near full, the item is added to the cache and the cache scavenger is scheduled. The cache scavenger attempts to accumulate a free pool of resources of a particular size and will continue scavenging buffers until the pool reaches this thresfhold. In general, the scavenger is scheduled when the free pool shrinks below a minimum threshold. In a system where multiple client workloads access a buffer cache, scavenging based on buffer age alone can lead to degraded service for some users when there are other users that have a much higher buffer access rate. This situation can lead to unfair scavenging of the slower users.

Prior attempts to obviate the enumerated drawbacks include physically partitioning client workloads within the buffer cache. However, physically partitioning a buffer cache limits workloads to preset allocations, and does not provide flexibility in actual work performance.

Figure 1:
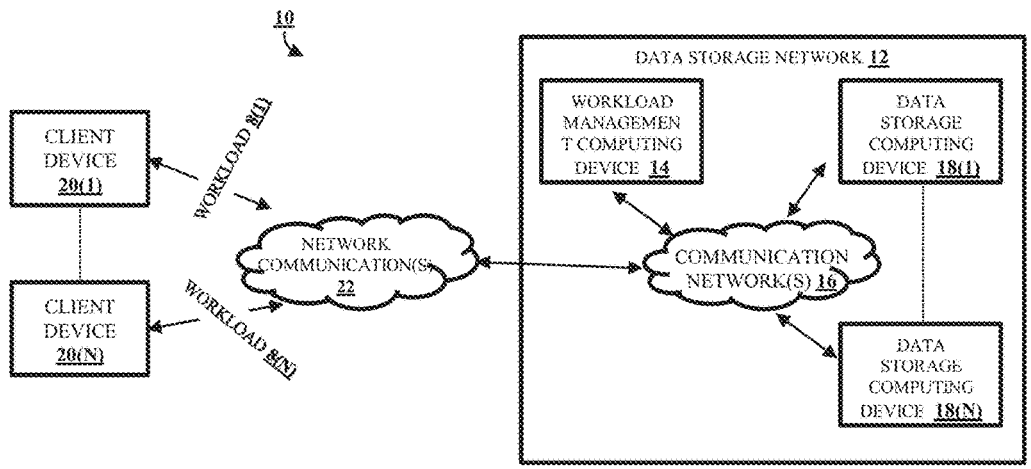
FIG. 1 is a schematic diagram illustrating a representative file system buffer cache with a workload management scheme appliance in accordance with aspects of the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for integrating a workload management scheme for a file system buffer cache with a global recycle queue infrastructure. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a write anywhere file system.

It is desirable to improve the performance of storage servers, and one way to do so is by integrating a workload management scheme for a file system buffer cache with a global recycle queue infrastructure. Aspects of this disclosure are directed to methods, non-transitory computer readable media, and devices for allocating a certain portion of the buffer cache without physically partitioning the buffer resources, and tracking the buffer usage per workload. Disclosed, for example, workloads receive an allocation that is guaranteed to stay in a core via a logical partitioning of buffers. The workloads are also restricted with a soft limit percentage where workloads exceeding the soft limit percentage will be provided a degraded service except, for instance, where the workload exists alone in the mass data storage system. With such a scheme, if a workload exceeds its share of resources but there are no other clients in the mass data storage system, then the service will not be interrupted. In other words, the service is degraded when its service affects other workloads. As a result, the file system buffer cache is not physically partitioned. In addition, the ability to detect deviant behavior such as abusive utilization of buffer cache is provided. The ability to limit a deviant workload and prevent thrashing, or kicking out buffers from other workloads is also provided.

For at least some embodiments, the workloads are initially identified, and allocated a specific percentage of the buffer cache available in the mass data storage system. Each workload may also be provided with a soft limit percentage. A soft limit percentage is an excess limit a workload is allowed to exceed prior to degrading the service for that workload. The buffers allocated to each workload are not scavenged by the mass data storage system. Moreover, the service is not degraded where the workload exists individually in the mass data storage system. Each buffer is tagged associated with a workload identifier. Upon tagging each buffer, the buffers are tracked based on the workload they are associated with. After identifying the workloads and tagging each buffer associated with the workload, it is determined if the workload is abusing its buffer cache usage in a way that negatively affects other workloads. Upon determining the workload is abusing its buffer cache usage by exceeding its soft limit in a way that negatively affects other workloads, its buffers are scavenged more aggressively than those from other workloads, thereby degrading its performance. In certain embodiments, the buffers in the buffer cache are scavenged as described in U.S. patent application Ser. No. 14/743,322 filed Jun. 18, 2015, entitled "Methods for Managing a Buffer Cache and Devices Thereof" which is incorporated by reference herein in its entirety.

Referring now to the drawings, wherein like reference numerals refer to like features throughout the several views, there is shown in FIG. 1 a mass data storage system, designated generally at 10, including an example of a data storage network 12 in accordance with aspects of the present disclosure. The data storage network 12 includes, but is not limited to, a workload management computing device 14 coupled by communication network(s) 16 to data storage computing devices 18(1)-18(n). The workload management computing device 14 is coupled to a plurality of client devices 20(1)-20(n) by communication network(s) 22. Each client device within the plurality of client devices 20(1)-20(n) includes a corresponding workload from the plurality of workloads 8(1)-8(n). In other examples, this mass data storage system 10 can include other numbers and types of systems, devices, components, and/or elements in other configurations. This technology provides a number of advantages including methods, non-transitory computer readable media, and devices that facilitate a more efficient operation of a buffer cache via logical partitioning of buffers in order to provide workload-based scavenging control, as described below.

Figure 2:
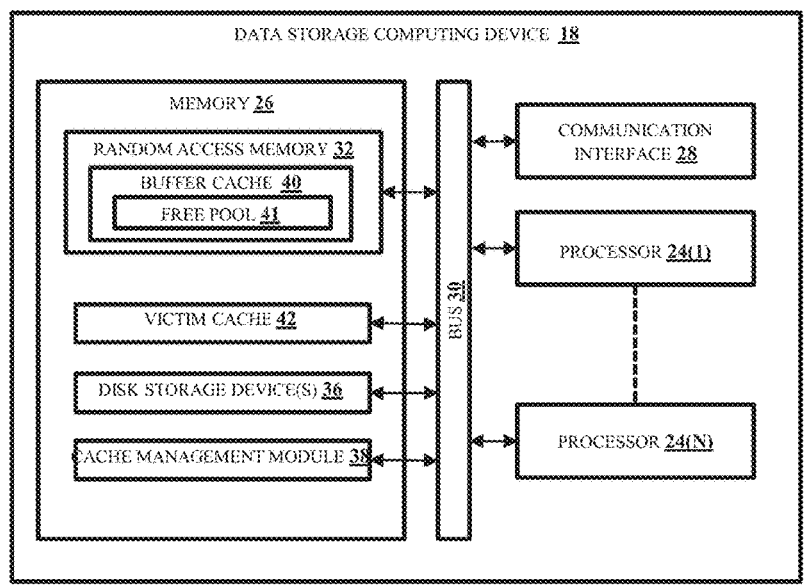
FIG. 2 is a schematic diagram illustrating a representative data storage computing device in accordance with aspects of the present disclosure.

Referring to FIG. 2, a block diagram of one of the exemplary data storage computing devices 18(1)-18(n) is illustrated. The data storage computing device 18 is generally configured to receive requests to write data to storage devices and to read from the storage devices. The data storage computing device 18, in this particular example, includes processors 24(1)-24(n), a memory 26, and a communication interface 28, which are all coupled together by a bus 30 or other communication link. The data storage computing device 18 can have other types and numbers of components or other elements.

The processors 24(1)-24(n) of the data storage computing device 18 each executes a program of stored instructions for one or more aspects of this technology, as described and illustrated by way of the embodiments herein, although the processors 24(1)-24(n) could execute other numbers and types of programmed instructions. The processors 24(1)-24(n) in the data storage computing device 18 may include one or more central processing units or general purpose processors with one or more processing cores, for example.

The memory 26 of the data storage computing device 18 in this particular example includes random access memory (RAM) 32, victim cache 42, disk storage device(s) 36, and a cache management module 38, although the memory 26 may include any of various forms of read only memory (ROM), RAM, Flash memory, non-volatile, or volatile memory, or the like, or a combination of such devices for example. The RAM 32 in this example includes a buffer cache 40, although the buffer cache can be located elsewhere and/or in another type of medium. The buffer cache 40 in this example is a repository for cached reads and writes associated with blocks of the disk storage device(s) 36 that are maintained in the form of buffers that can be used to service future reads to data storage blocks more efficiently. The victim cache 42 stores buffers and other information in a medium such as flash that is slower than the RAM 32 but faster than the disk storage device(s) 36, although other types of memory, with different relative latencies, can be used for the victim cache 42 in other examples.

The disk storage device(s) 36 can include optical disk-based storage or any other type of storage devices suitable for storing files or objects for short or long term retention, for example. Other types and numbers of storage devices can be included in the memory 26 or coupled to the data storage computing device 18 in other examples. Additionally, one or more disk shelves with storage devices can be included in the data storage network 12 in one or more separate or dedicated storage servers in other examples.

The cache management module 38 manages or operates the buffer cache 40 and the victim cache 42. Generally, the cache management module 38 populates the buffer cache 40 and the victim cache 42, determines when resources need to be freed into a free pool 41, and manages aging and scavenging operations for the buffer cache 40 and the victim cache 42, as described and illustrated in more detail later.

The communication interface 28 of the data storage computing device 18 in this example operatively couples and communicates between the data storage computing device 18 and the workload management computing device 14 and the client devices 20(1)-20(n) via the communication network(s) 16 and/or 22, although other types and numbers of communication networks or systems with other types and numbers of connections and configurations to other devices and elements can also be used.

By way of example only, the communication network(s) 16 and 22 can use TCP/IP over Ethernet and industry-standard protocols, including NFS, CIFS, SOAP, XML, LDAP, and SNMP, although other types and numbers of communication networks, can be used. The communication network(s) 16 and 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Referring back to FIG. 1, the workload management computing device 14 receives requests to write and read data from the client devices 20(1)-20(n) via the communication network(s) 16 and/or 22 and communicates with the data storage computing devices 18(1)-18(n) in order to service the requests. Accordingly, the workload management computing device 14 in this example includes a processor, a memory, and a communication interface, which are all coupled together by a bus or other communication link. The workload management computing device 14 can have other types and numbers of components or other elements.

Each of the client devices 20(1)-20(n) includes a processor, a memory, a communication interface, and, optionally, an input device and a display device, which are coupled together by a bus or other communication link. The client devices 20(1)-20(n) can have other types and numbers of components or other elements. The client devices 20(1)-20(n) may communicate with the workload management computing device 14 and/or the data storage computing devices 18(1)-18(n) to store and retrieve data. One or more of the client devices 20(1)-20(n) may be, for example, a conventional personal computer, a server hosting application(s) that utilize back-end storage provided by the data storage network 12, or any other type of processing and/or computing device.

The workloads 8(1)-8(n) are separate or distinct from each other because they have different sources, or they originate from different applications or different client devices 20(1)-20(n). Thus, each workload associated with requests from a different application can be referred to as a distinct workload. Ideally, the different workloads 8(1)-8(n) could access either the same or different buffers within the data storage computing devices 18(1)-18(n). Depending on the different workloads 8(1)-8(n), the workload management computing device 14 makes certain caching decisions as explained below.

Figure 3A:
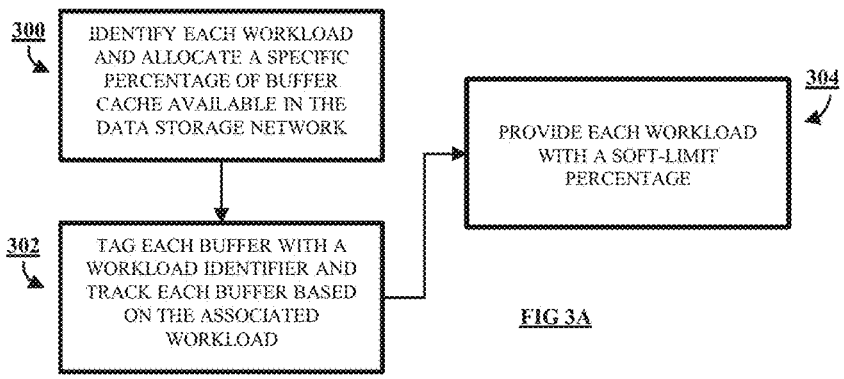
FIG. 3A-3C are flowcharts of an exemplary method for integrating a workload management scheme for a file system buffer cache with a global recycle queue infrastructure in accordance with aspects of the present disclosure.

An exemplary method for integrating a workload management scheme for a file system buffer cache with a global recycle queue infrastructure will now be described with reference to FIGS. 1-6. Referring more specifically to FIG. 3, an exemplary method for allocating buffers within the buffer cache 40 to specific workloads is illustrated. In step 300 in this particular example, each workload 8(1)-8(n) is identified, and allocated a specific percentage of the buffer cache available in the mass data storage system. This allocation is saved and executed within the cache management module 38 via a logical partitioning of buffers. In other words, the buffers allocated to the workload are unable to be scavenged. The workloads 8(1)-8(n) can be identified by the workload management computing device 14 based on a stored policy or set of rules and can correspond to one of the client devices 20(1)-20(n), for example. The workloads 8(1)-8(n) can also be identified by the client device for which each workload corresponds. The percentage allocation of the buffers for each workload can be determined based on subscription, prior use/performance, etc. For example, a user located at a client device may subscribe to a data size of buffer cache based on performance projections. In other embodiments, a user may be allocated a data size of buffer cache based on prior performance and demands. The percentage allocation of the buffers for each workload can be determined based on other parameters in other examples.

In step 302, the data storage computing device 18 tags each buffer in buffer cache 40 with a workload identifier, and tracks each buffer based on the workload it is associated with. Every buffer utilized by the workload is tagged regardless of whether we are under or over our cache allocation or soft limit. The workload identifier may be stored within the data of each buffer. The buffers can be tracked by the cache management module 38 based on the data read from the disk storage device(s) 36. Each buffer also includes system data or metadata, and other types of data can also be utilized for tracking the buffer within the buffer cache 40. The metadata in this particular example includes at least a thread identifier for a thread (also referred to herein as an affinity or "Aff") associated with the data. Optionally the metadata also includes a timestamp including a time at which the buffer is inserted and other information can also be stored along with the buffer as associated metadata.

In step 304, the workloads are restricted with a soft limit percentage where workloads exceeding the soft limit percentage will be provided a degraded service. A soft limit percentage is an excess limit a workload is allowed to exceed prior to degrading the service for that workload. This is true, except where the workload exists alone in the mass data storage system 10, as explained below with respect to FIG. 3B.

Figure 3B:
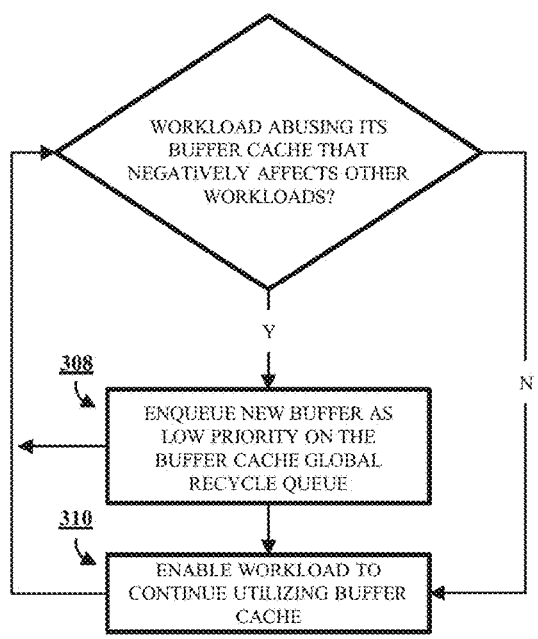

Referring to FIG. 3B, an exemplary method of limiting buffer cache usage by the workspace is illustrated. In step 306, the workload management computing device 14 determines whether a workload is abusing its buffer cache usage in a way that negatively affects other workloads, such as by thrashing, or kicking out buffers from other workloads, for example. Buffer thrashing can occur when the workload management computing device 14 introduces a new buffer in a workload and it is immediately scavenged. This process can be repetitive, looping interminably. For example, the buffer may be introduced and scavenged, reintroduced and scavenged again, and so on. In other words, a buffer is basically cycling and it is not held in memory long enough for it to be useful. Buffer thrashing can slow down the mass data storage system and provide a degraded service to a workload. A workload can be determined to be abusing its buffer cache usage in a way that negatively affects other workloads in other ways. However, if a workload exceeds its share of resources but there are no other clients in the mass data storage system 10, then the service will not be interrupted. In other words, the service is degraded when its service affects other workloads. This allows the mass data storage system 10 to operate in a manner in which the buffer cache is not physically partitioned. If the workload management computing device 14 determines that a workload is abusing its buffer cache usage in a way that negatively affects other workloads, then the Yes branch is taken to step 308. In step 308, the buffers tagged with a workload identifier of the abusing workload, are prioritized very low in the buffer cache and are eligible for scavenging, thereby facilitating degraded service for that workload, by the data storage computing device 18.

Figure 3C:
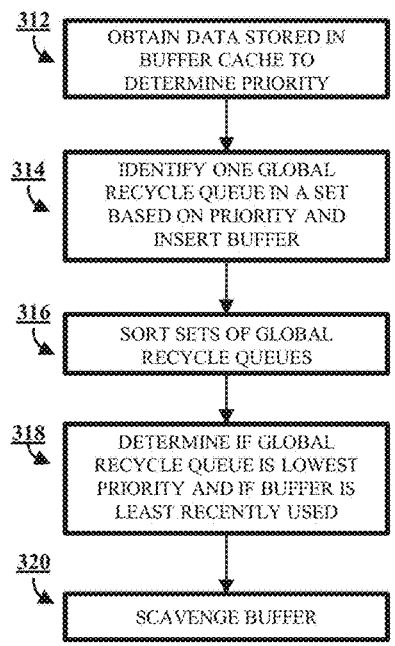

An exemplary method for scavenging a buffer in the buffer cache will now be described with reference to FIG. 3C. In certain embodiments, only buffers made available to be scavenged undergo the following process. Buffers of workloads that have allocated cache and whose occupancy is within the allocation constraints are not made available. In step 312, the data storage computing device 18 obtains data stored in a buffer to determine a priority of the buffer based on the data. The priority of the buffer can be determined based on the data, such as a type of the data. For example, in some embodiments user data has a lower priority than system data. The priority can be determined based on other parameters in other examples as well. In step 314, the data storage computing device 18 identifies one global recycle queue in a set of global recycle queues based on the priority, and inserts the buffer.

Figure 7:
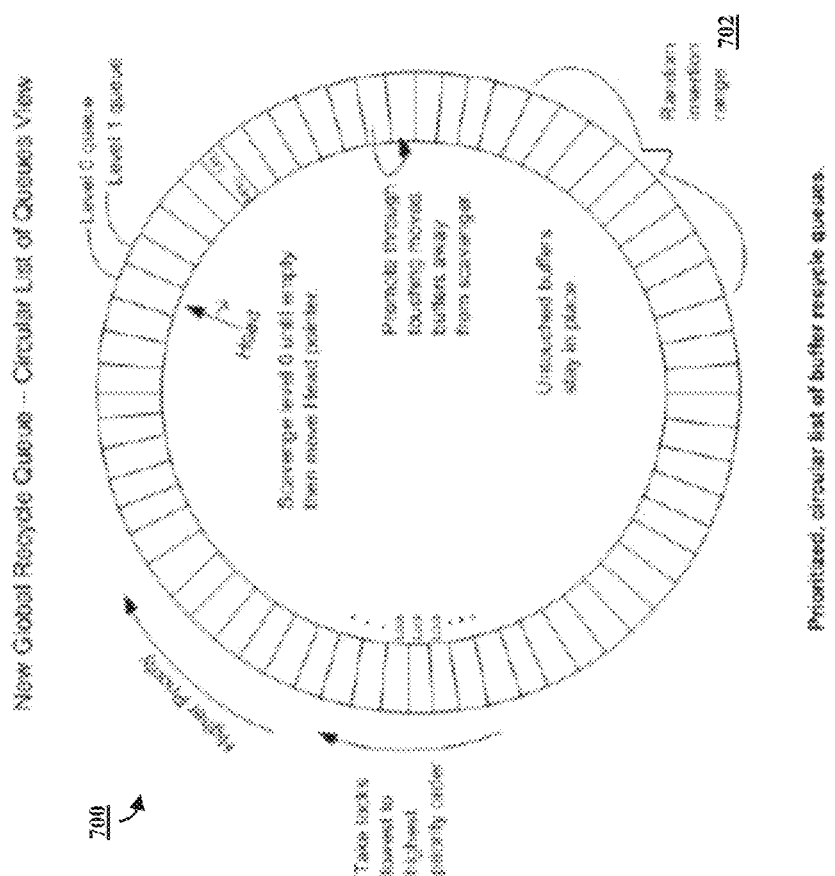
FIG. 7 is a block diagram of an exemplary set of global recycle queues.

Referring to FIG. 7, a block diagram of an exemplary set of global recycle queues 700 is illustrated. In this example, each of the global recycle queues in the set of global recycle queues 700 is capable of holding a plurality of buffers in a most recently used to least recently used order. Each global recycle queue in the set of global recycle queues 700 has an associated priority level and the set of global recycle queues 700 is organized based on the associated priority level of each of the global recycle queues from a lowest priority to a highest priority. The set of global recycle queues 700 is circular in this example and, accordingly, the lowest priority global recycle queue in the set of set of global recycle queues 700 is identified based on a head pointer, as described and illustrated in more detail later.

Optionally, the one of the set of global recycle queues 700 into which the buffer is inserted can be identified based on a random selection from an established insertion window 702 or range corresponding to a subset of global recycle queues in the set of global recycle queues 700. Since a significant proportion of the buffers may store user data having substantially the same priority upon insertion, utilizing a random selection within the insertion window 702 distributes the buffers within the insertion window 702 in the set of global recycle queues 700. As the processors 24(1)-24(n) lock an entire global recycle queue in order to access a buffer held by the global recycle queue, distributing the buffers within the insertion window 702 advantageously reduces the occurrence of lock contention among the processors 24(1)-24(n).

In step 316, the data storage computing device 18 sorts the set of global recycle queues. Upon sorting the set of global recycle queues, the process advances to step 318 where the data storage computing device 18 determines when the global recycle queue is the lowest priority one of the set of global recycle queues. The data storage computing device 18 also determines if the buffer is a least recently used one of one or more buffers in the global recycle queue, and removes the buffer from the global recycle queue and inserts the buffer into a per-thread recycle queue identified based on the thread identifier.

In step 320, when the data storage computing device 18 indicates the global recycle queue is the lowest priority of the set of global recycle queues and the buffer is a least recently used buffer in the global recycle queue, the buffer is scavenged. That is, the buffer is removed from the per-thread recycle queue and placed in a free pool to be used by other workloads.

Figure 8:
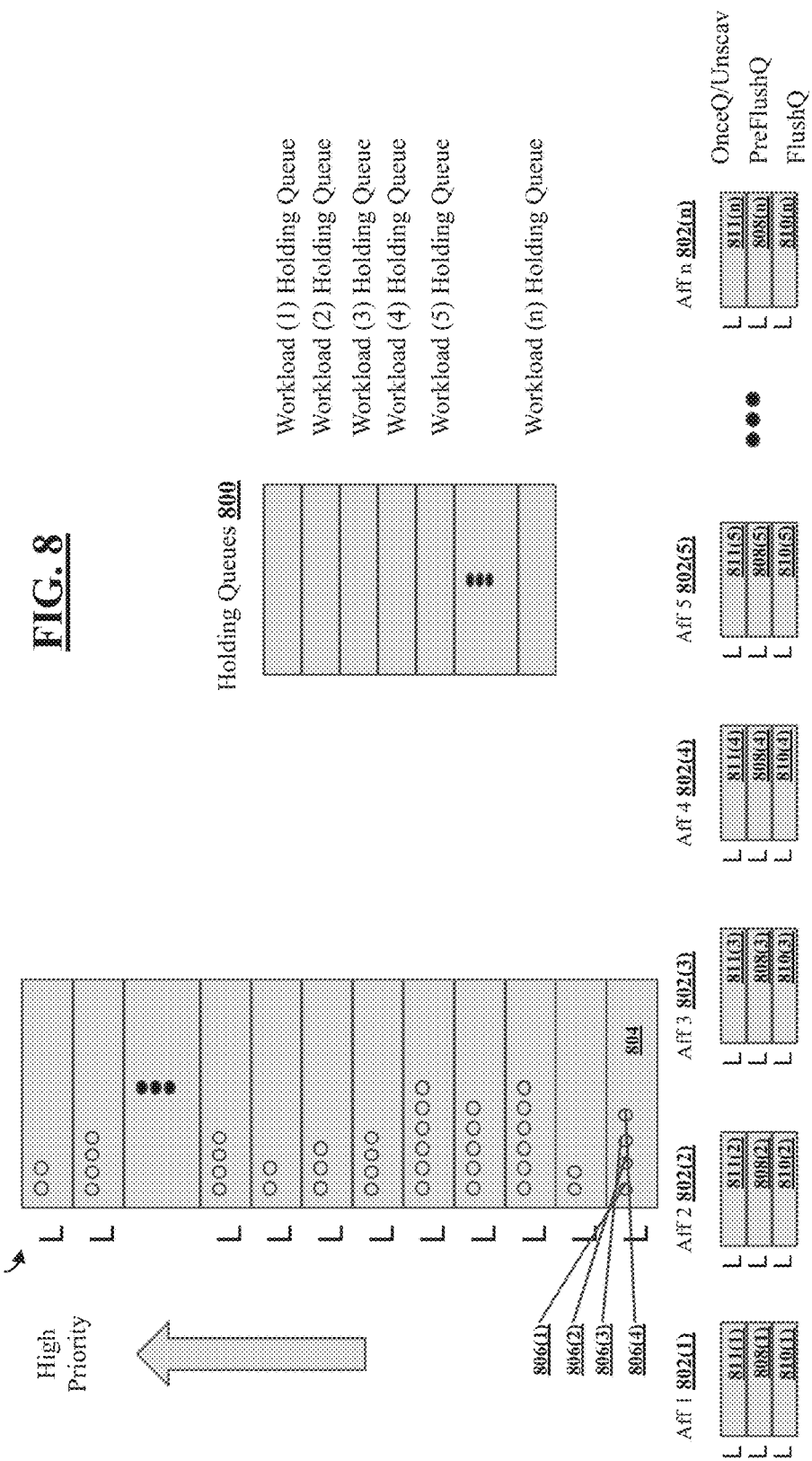
FIG. 8 is a block diagram of the exemplary set of global recycle queues, an exemplary set of holding queues, and an exemplary set of per-thread recycle queue.

Referring to FIG. 8 a block diagram of the set of global recycle queues 700, an exemplary set of holding queues 800, and an exemplary set of per-thread recycle queues 802(1)-802(n) for each of a plurality of threads is illustrated prior to any sorting or scavenging. In this example, the global recycle queue 804 is the lowest priority one of the set of global recycle queues 700 and it includes four buffers 806(1), 806 (2), 806 (3), and 806(4). Additionally, in this example, each of the sets of per-thread recycle queues 802(1)-802(n) includes a pre-flush queue 808(1)-808(n), a flush queue 810(1)-810(n), and a once queue 811(1)-811(n).

While optional pre-flush queues 808(1)-808(n) and once queues 811(1)-811(n) are included in each of the sets of per-thread recycle queues 802(1)-802(n) in this example, in other examples, only flush queues 810(1)-810(n) can be used. The pre-flush queues 808(1)-808(n) are used to facilitate movement of buffers to the optional victim cache 42, as described and illustrated in more detail later. The once queue 811(1)-811(n) holds buffers that are speculatively read-ahead or expected to only be accessed one time in the future. When the buffers are accessed that one time, they are immediately scheduled for scavenging. If a buffer is not accessed within a fixed time period from being read, then the buffer is expired and scavenged.

Figure 9:
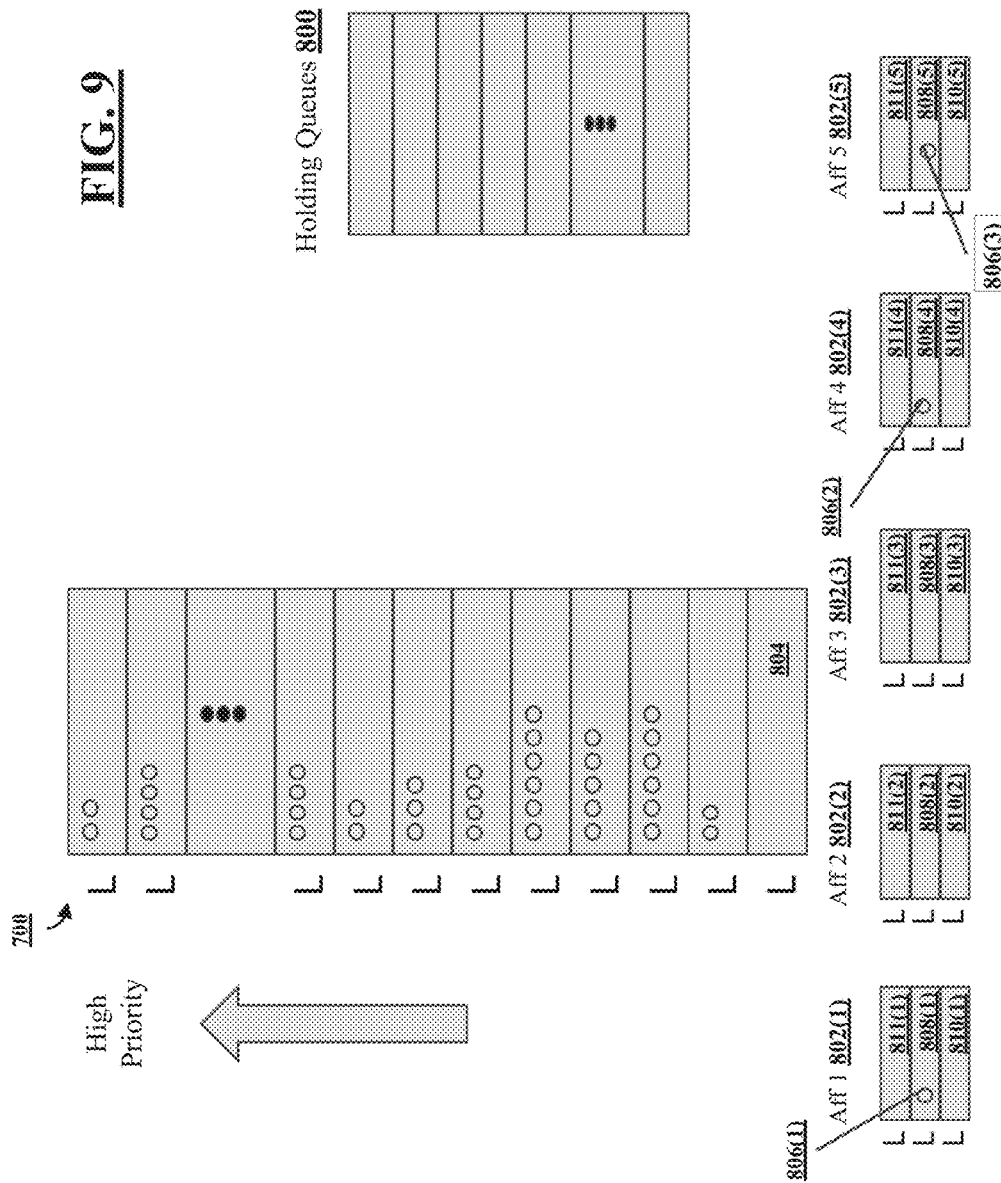
FIG. 9 is a block diagram of the exemplary set of global recycle queues, an exemplary set of holding queues, and an exemplary set of per-thread recycle queue.
Figure 10:
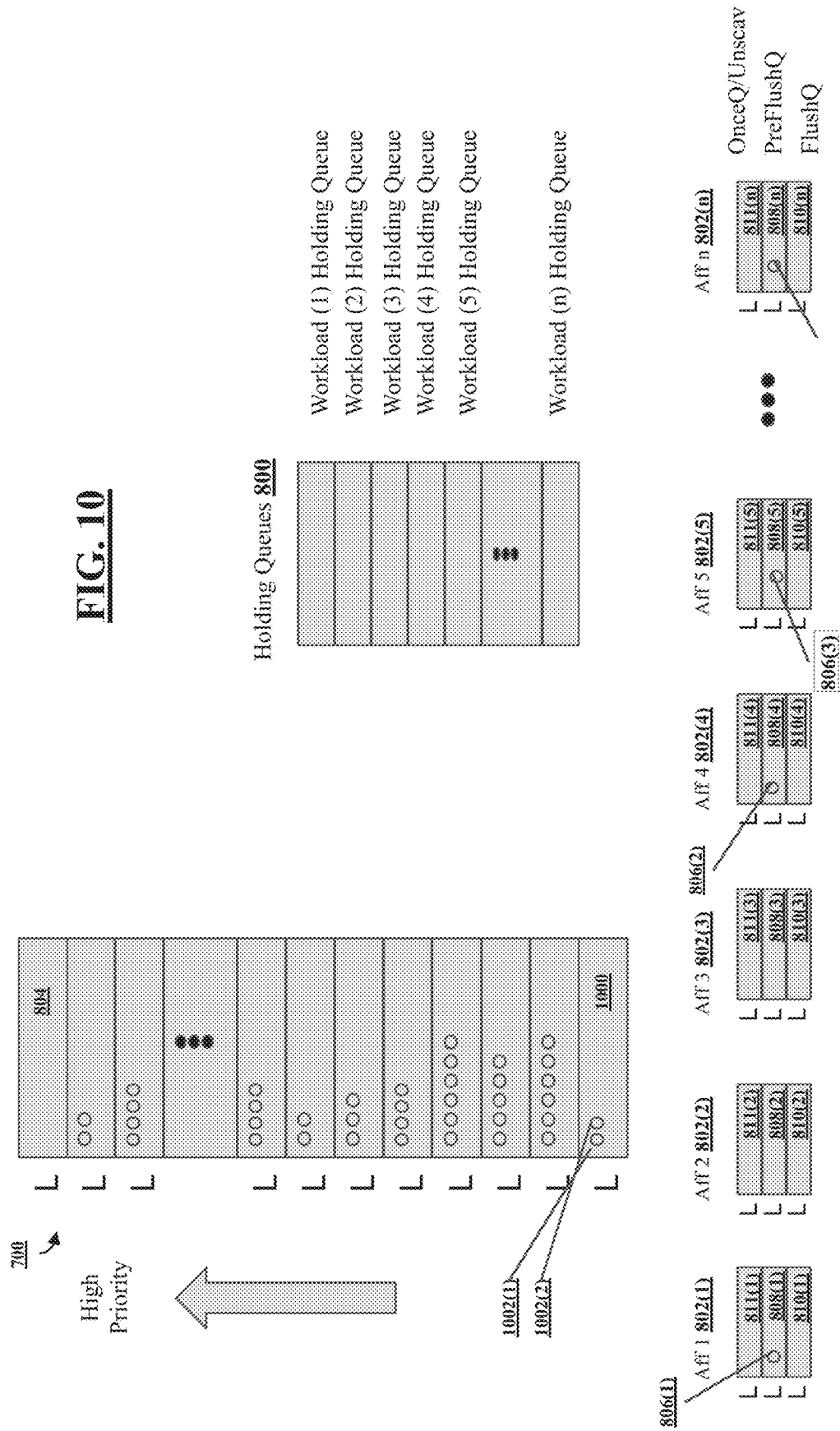
FIG. 10 is a block diagram of the exemplary set of global recycle queues, an exemplary set of holding queues, and an exemplary set of per-thread recycle queue.

Referring to FIG. 9 where the four buffers 806(1), 806(2), 806(3), and 806(4) are all moved to a pre-flush queue 808(1)-808(n) of one per-thread recycle queues 802(1)-802(n), respectively, for a corresponding thread. The lowest priority global recycle queue 804 is empty after the four buffers 806(1), 806(2), 806(3), and 806(4) are all moved to a pre-flush queue 808(1)-808(n). Accordingly, the head pointer will be moved. Referring to FIG. 10, where the global recycle queue 804 has become the highest priority global recycle queue and the global recycle queue 1000 has become the lowest priority recycle queue via the movement of the head pointer. The global recycle queue 1000 includes two buffers 1002(1) and 1002(2).

Figure 11:
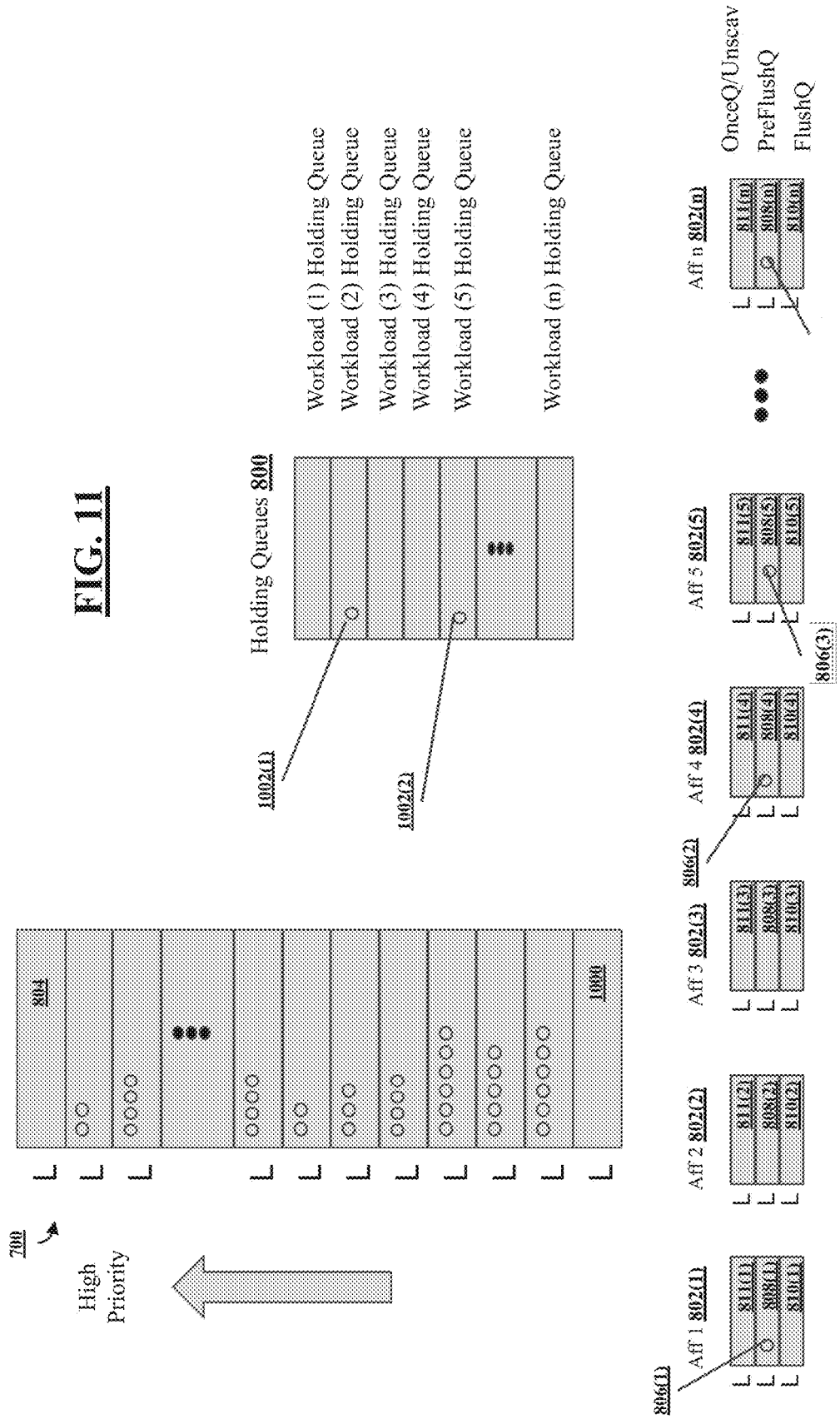
FIG. 11 is a block diagram of the exemplary set of global recycle queues, an exemplary set of holding queues, and an exemplary set of per-thread recycle queue.
Figure 12:
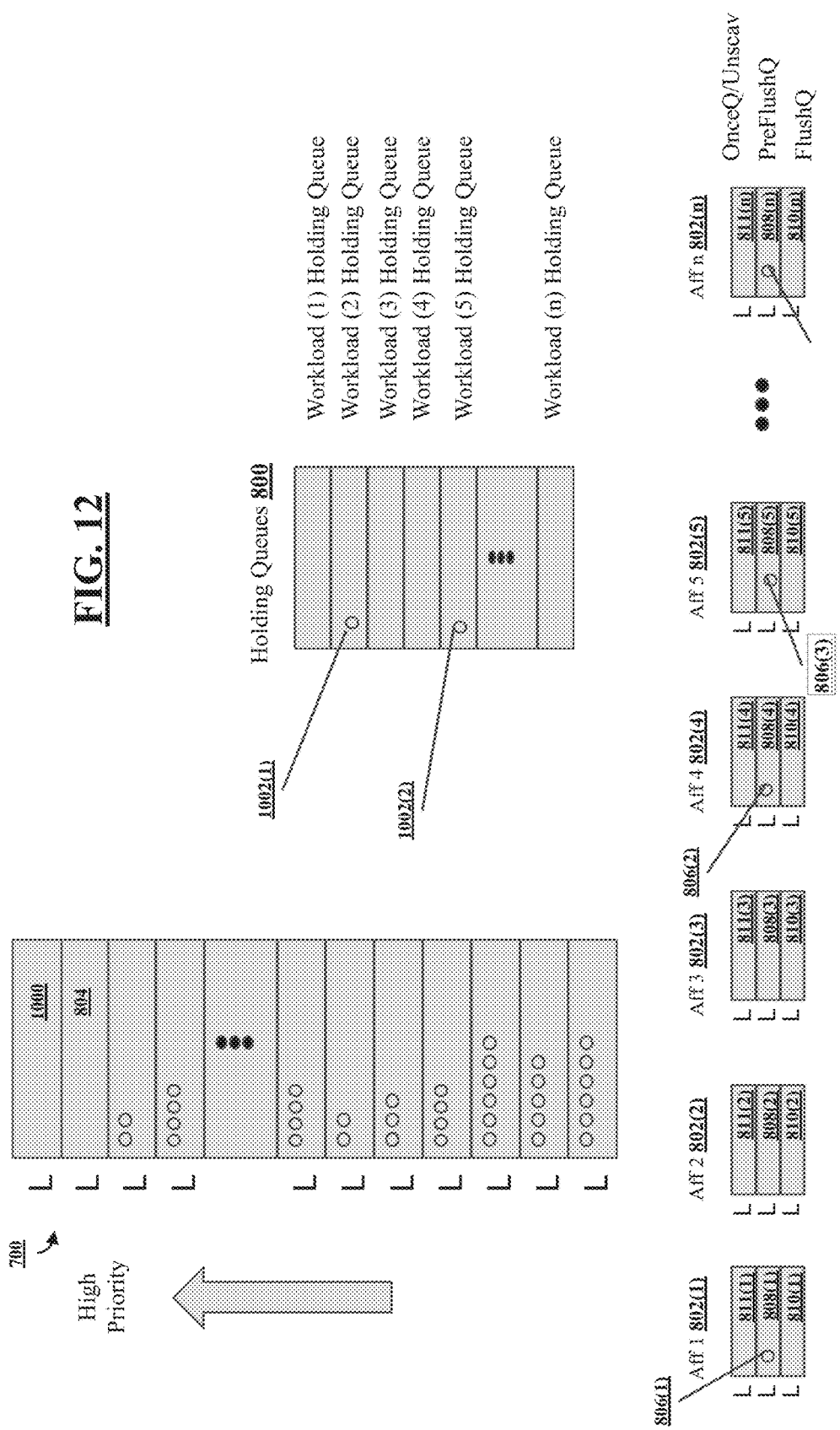
FIG. 12 is a block diagram of the exemplary set of global recycle queues, an exemplary set of holding queues, and an exemplary set of per-thread recycle queue.
Figure 13:
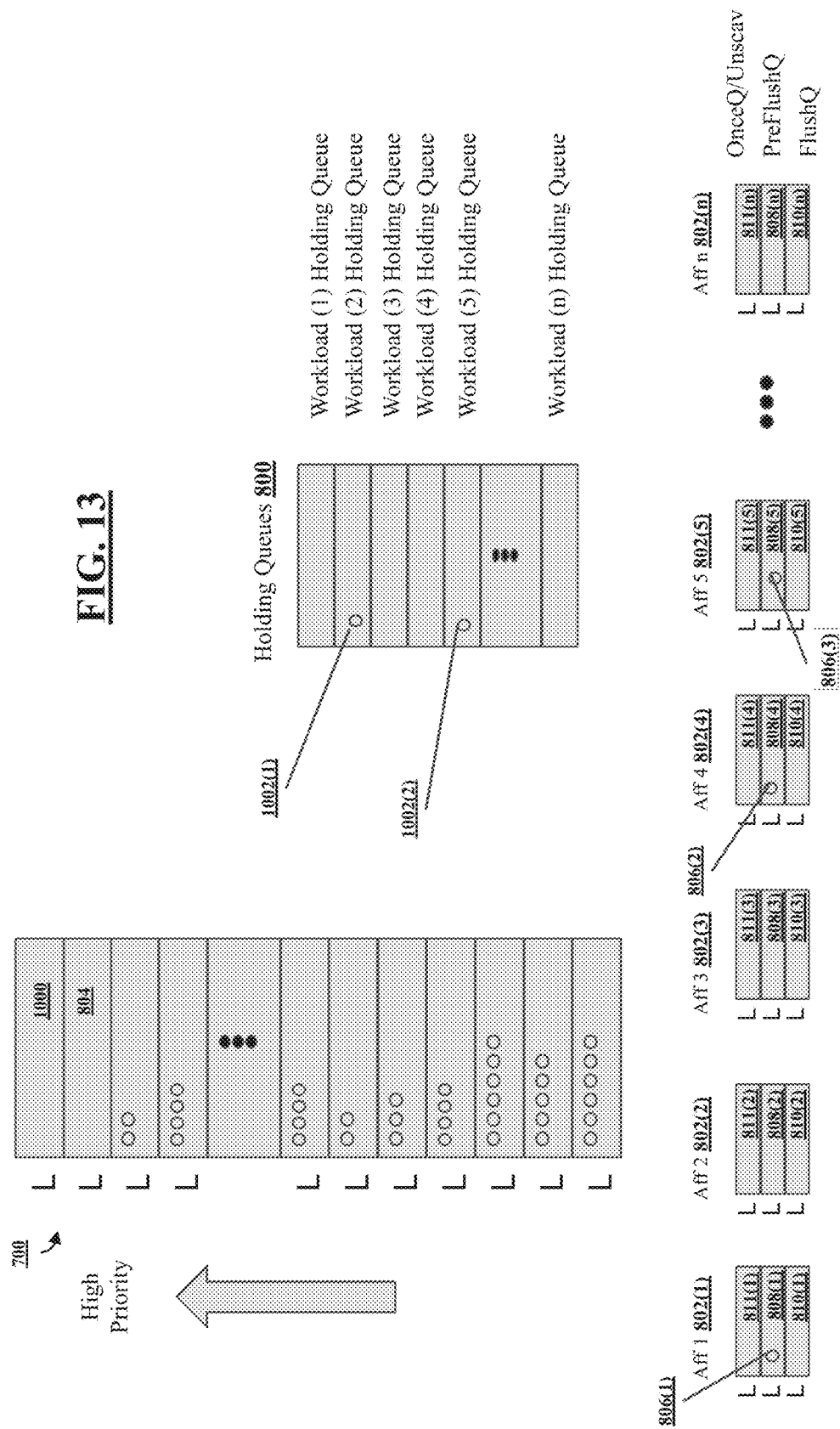
FIG. 13 is a block diagram of the exemplary set of global recycle queues, an exemplary set of holding queues, and an exemplary set of per-thread recycle queue.

Referring to FIG. 11, where the two buffers 1002(1) and 1002(2) have both been moved from the lowest priority global recycle queue 1000 to respective queues in the set of holding queues 800 because the respective workloads had a cache allocation and have not exceeded that allocation. Referring to FIG. 12 where the lowest priority global recycle queue 1000 is empty subsequent to moving the buffers 1002(1) and 1002(2) to the set of holding queues 800. Accordingly, the global recycle queue 1000 has become the highest priority global recycle queue via the movement of the head pointer. Referring to FIG. 13, where the buffer 806(4), which was present in the pre-flush queue 808(n), as illustrated in FIG. 12, is removed from the pre-flush queue 808(n) and inserted into the victim cache 42.

Figure 14:
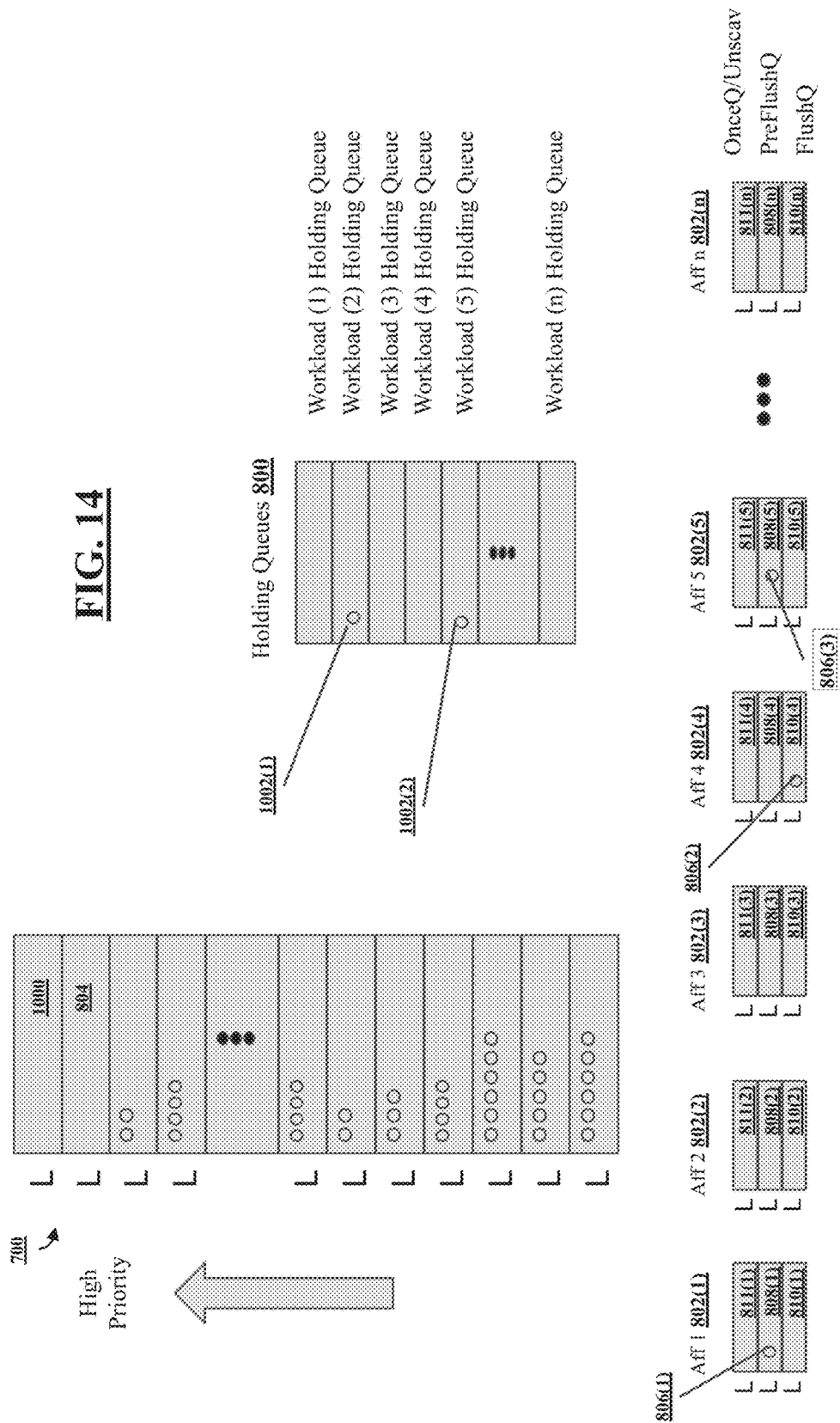
FIG. 14 is a block diagram of the exemplary set of global recycle queues, an exemplary set of holding queues, and an exemplary set of per-thread recycle queue.
Figure 15:
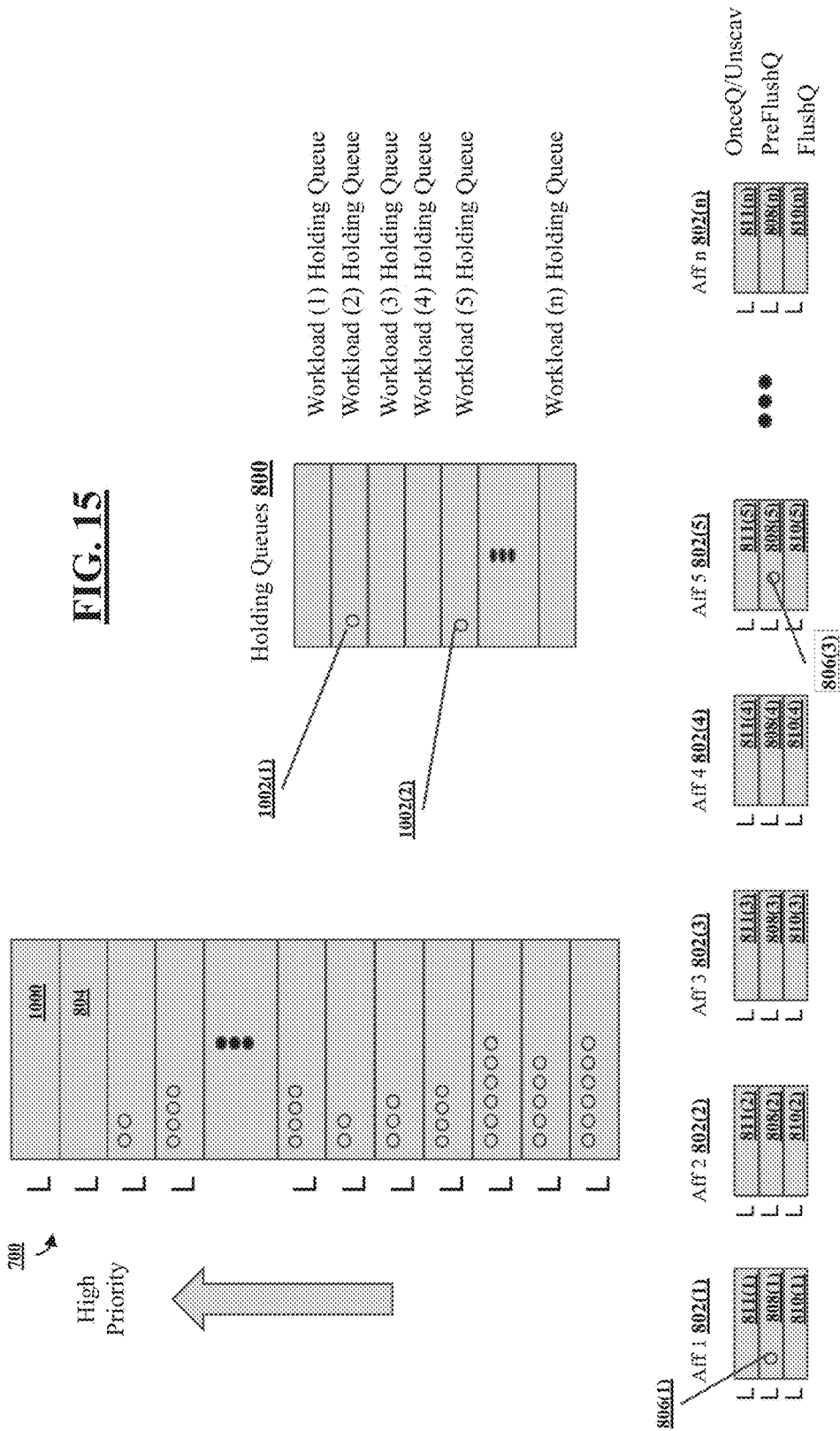
FIG. 15 is a block diagram of the exemplary set of global recycle queues, an exemplary set of holding queues, and an exemplary set of per-thread recycle queue.

Referring to FIG. 14, where the buffer 806(2) was offered to the victim cache 42 but the victim cache 42 did not accept it and it was therefore moved to the flush queue 810(4) of the set of per-thread recycle queues 802(4). Finally, in FIG. 15 the data storage computing device determined that a buffer should be removed from the flush queue 810(4) and identified the buffer 806(2) as the least recently used buffer in the flush queue 810(4). Accordingly, the data storage computing device 18 removed the buffer 806(2) from the flush queue 810(4) and thereby returned the buffer 806(2) to the free pool so that it is available for reuse by the same or another thread executing on one of the processors 24(1)-24(n). Therefore, the flush queue 810(4) is illustrated in FIG. 15 without the buffer 806(2).

Referring back to FIG. 3B, in step 306, if the workload management computing device 14 determines the workload is not abusing its buffer cache usage in a way that negatively affects other workloads then the No branch is taken to step 310. In step 310, the workload is uninterrupted, and allowed to continue utilizing the buffer cache even though its allocation was lower. Subsequent to determining the workload is not abusing its buffer cache usage in a way that negatively affects other workloads, workload management computing device 14 proceeds back to step 306.

Figure 4:
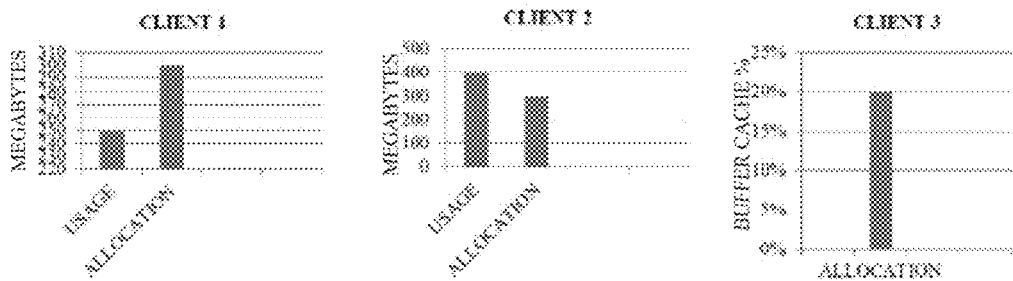
FIG. 4 is exemplary tables of workload usage in accordance with aspects of the present disclosure.

Referring to FIG. 4, exemplary tables of workload usage are provided. In this example, client 1 has allocated 300 megabytes of buffer cache, and its current usage is 250 megabytes of buffer cache. Client 1 has no soft limit percentage, and is underutilizing its allocated buffer cache. Therefore, if client 1 were to bring in a new buffer it would still be within its allocation, and will not have any buffers available to be scavenged by the data storage computing device 18. Therefore, if the scavenger sees a buffer from client 1 it will put it aside into a holding queue and the buffer will not be scavenged.

Client 2 has an allocation of 300 megabytes, and is currently utilizing 400 megabytes. Client 2 has exceeded its allocation. Therefore, its buffers are not subject to protection from the scavenger when they are encountered in the recycle queues by the data storage computing device 18.

Client 3 has been allocated a soft limit of 20 percent of the buffer cache. Upon exceeding the 20 percent, its buffers are going to be subject to degraded service in the recycle queues. However, where it is only using 20 percent or lower of the buffer cache, its buffers are prioritized normally alongside buffers of other workloads.

Figure 5:
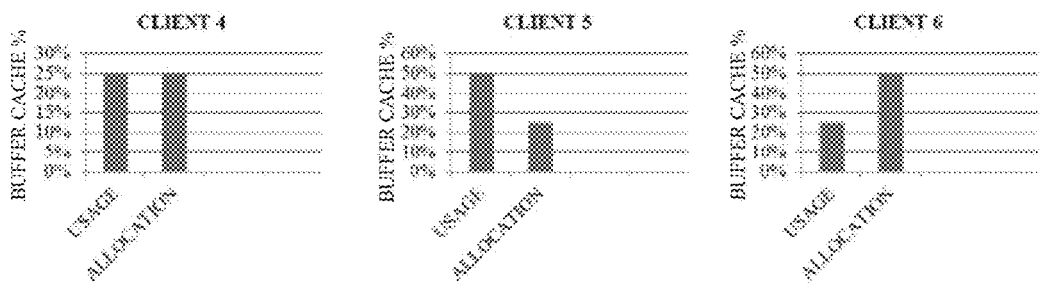
FIG. 5 is exemplary tables of workload usage in accordance with aspects of the present disclosure.

Referring to FIG. 5, exemplary tables of workload usage are provided. In this example, client 4 has been allocated 25 percent of buffer cache, and its current usage is 25 percent of the buffer cache. Therefore, if client 4 were to bring in a new buffer it would be made available to be scavenged by the data storage computing device 18. If the scavenger sees a buffer from client 4 it will be put it aside into a holding queue and the buffer will not be scavenged until it has exceeded its allocation of 25 percent of the buffer cache.

Client 5 has allocated 25 percent, and is currently utilizing 50 percent of the buffer cache. Client 5 has exceeded its allocation. Therefore, its buffers have been made available to be scavenged by the data storage computing device 18.

Client 6 has allocated 50 percent of the buffer cache, and its current usage is only at 25 percent of the buffer cache. Client 6 is underutilizing its allocated buffer cache. Therefore, if client 6 were to bring in a new buffer it would still be within its allocation, and will not have any buffers available to be scavenged. Therefore, if the scavenger sees a buffer from client 6 it will put it aside into a holding queue and the buffer will not be scavenged. This protects client 6 and ensures that it is able to fully utilize its allocated percentage of buffer cache.

Figure 6:
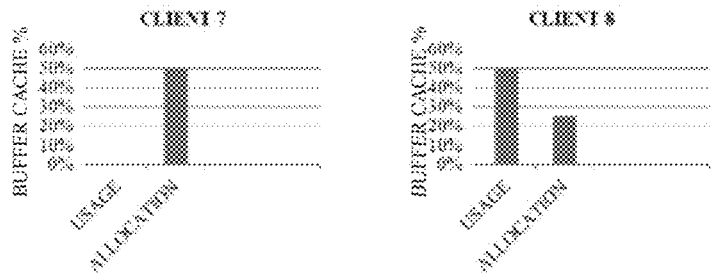
FIG. 6 is exemplary tables of workload usage in accordance with aspects of the present disclosure.

Referring to FIG. 6, exemplary tables of workload usage are provided. In this example, client 7 has established a soft limit of 50 percent of buffer cache, and its current usage is 0 percent of the buffer cache. Therefore, if client 7 were to bring in a new buffer it would still be within its soft limit, and will not be subject to degraded service. Client 8 is exceeding its buffer cache soft limit. As client 8 brings in more buffers, they will be brought in at a very low priority and may be subjected to scavenging quickly assuming that other workloads in the system are in need of buffers.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method comprising:
   identifying, by a storage server, a workload from a plurality of different workloads generated by one of a plurality of applications and a plurality of computing devices, for using a data storage system;
   allocating at least a portion of a buffer cache in the data storage system to the identified workload by logically partitioning the buffer cache, without physically partitioning the buffer cache;
   establishing a soft-limit on allowable usage for the identified workload, above which additional usage of the buffer cache by the identified workload is degraded;
   determining if the identified workload is exceeding its allocated portion of the buffer cache;
   determining that usage of the buffer cache by the identified workload does not negatively impact performance of another workload and continue to use the buffer cache by the identified workload in excess of the allocated portion; and
   if the identified workload is exceeding its allocated buffer cache, by an excess, and negatively impacts performance of the another workload, making at least a portion of the excess amount available for scavenging by lowering a queue priority assigned to the identified workload.

2. The method of claim 1, further comprising storing the workload identifier within data of each buffer.

3. The method of claim 1, further comprising tagging a buffer from within the buffer cache with a workload identifier and tracking usage of each buffer.

4. The method of claim 1, wherein the identifying the workload from a plurality of workloads comprises identifying the workload based on at least one parameter that includes: a stored policy; a set of rules; and a corresponding client device.

5. The method of claim 1, wherein allocating at least a portion of the buffer cache in the data storage network comprises allocating at least one parameter that includes: a specific data size, and a percentage of buffer cache in the data storage system.

6. The method of claim 1, wherein allocating at least a portion of the buffer cache in the data storage system comprises allocating the buffer cache either based on at least one parameter that includes: a subscription; prior use; and prior performance.

7. The method of claim 1, wherein the usage of the buffer cache by the identified workload negatively impacts performance of any other workload when a new buffer from the buffer cache is allocated for the any other workload and the new buffer is immediately scavenged.

8. A non-transitory machine-readable medium having stored thereon instructions for performing a method comprising machine executable code which when executed by at least one machine, causes the machine to:

identify a workload from a plurality of different workloads generated by one of a plurality of applications and a plurality of computing devices, for using a data storage system;

allocate at least a portion of a buffer cache in the data storage system to the identified workload by logically partitioning the buffer cache, without physically partitioning the buffer cache;

establish a soft-limit on allowable usage for the identified workload, above which additional usage of the buffer cache by the identified workload is degraded;

determine if the identified workload is exceeding its allocated portion of the buffer cache;

determine that usage of the buffer cache by the identified workload does not negatively impact performance of another workload and continue to use the buffer cache by the identified workload in excess of the allocated portion; and if the identified workload is exceeding its allocated buffer cache, by an excess, and negatively impacts performance of the another workload, make at least a portion of the excess amount available for scavenging by lowering a queue priority assigned to the identified workload.

9. The non-transitory computer readable medium of claim 8, wherein the machine is further configured to store the workload identifier within data of each buffer.

10. The non-transitory computer readable medium of claim 8, wherein the machine is further configured to tag a buffer from within the buffer cache with a workload identifier and track each buffer.

11. The non-transitory computer readable medium of claim 8, wherein the machine is configured to identify the workload based on at least one parameter that includes: a stored policy; a set of rules; and a corresponding client device.

12. The non-transitory computer readable medium of claim 8, wherein the machine is configured to allocate at least a portion of the buffer cache in the data storage network based on at least one parameter that includes: a specific data size, and a percentage of buffer cache in the data storage system.

13. The non-transitory computer readable medium of claim 8, wherein the machine is configured to allocate at least a portion of the buffer cache in the data storage network based on at least one parameter that includes: a subscription; prior use; and prior performance.

14. The non-transitory computer readable medium of claim 8, wherein the usage of the buffer cache by the identified workload negatively impacts performance of any other workload when a new buffer from the buffer cache is allocated for the any other workload and the new buffer is immediately scavenged.

15. A computing device, comprising:

a memory containing machine readable medium comprising machine executable code having stored thereon instructions for performing a method of integrating a workload management scheme for a buffer cache in a data storage system with a recycle queue infrastructure;

a processor coupled to the memory, the processor configured to execute the machine executable code to cause the processor to: identify a workload from a plurality of different workloads generated by one of a plurality of applications and a plurality of computing devices, for using a data storage system;

allocate at least a portion of a buffer cache in the data storage system to the identified workload by logically partitioning the buffer cache, without physically partitioning the buffer cache;

establish a soft-limit on allowable usage for the identified workload, above which additional usage of the buffer cache by the identified workload is degraded;

determine if the identified workload is exceeding its allocated portion of the buffer cache;

determine that usage of the buffer cache by the identified workload does not negatively impact performance of another workload and continue to use the buffer cache by the identified workload in excess of the allocated portion; and if the identified workload is exceeding its allocated buffer cache, by an excess, and negatively impacts performance of the another workload, make at least a portion of the excess amount available for scavenging by lowering a queue priority assigned to the identified workload.

16. The computing device of claim 15, wherein the processor is further configured to store the workload identifier within data of each buffer.

17. The computing device of claim 15, wherein the processor is further configured to tag a buffer from within the buffer cache with a workload identifier and track each buffer.

18. The computing device of claim 15, wherein the processor is configured to identify the workload based on at least one parameter that includes: a stored policy; a set of rules; and a corresponding client device.

19. The computing device of claim 15, wherein the processor is configured to allocate at least a portion of the buffer cache in the data storage network based on at least one parameter that includes: a specific data size, and a percentage of buffer cache in the data storage system.

20. The computing device of claim 15, wherein the processor is configured to allocate at least a portion of the buffer cache in the data storage network based on at least one parameter that includes: a subscription; prior use; and prior performance.

* * * * *